(12) United States Patent
Kanbara et al.

(10) Patent No.: US 11,142,110 B2
(45) Date of Patent: Oct. 12, 2021

(54) AIRBAG AND SUPPORT DEVICE

(71) Applicant: AISIN SEIKI KABUSHIKI KAISHA, Kariya (JP)

(72) Inventors: Tomoko Kanbara, Kariya (JP); Noriko Fujii, Kariya (JP); Ryosuke Mizuno, Kariya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 0 days.

(21) Appl. No.: 16/674,101

(22) Filed: Nov. 5, 2019

(65) Prior Publication Data

US 2020/0139866 A1 May 7, 2020

(30) Foreign Application Priority Data

Nov. 7, 2018 (JP) .............................. JP2018-209587

(51) Int. Cl.
*B60N 2/882* (2018.01)
*B60R 21/207* (2006.01)

(52) U.S. Cl.
CPC ............ *B60N 2/882* (2018.02); *B60R 21/207* (2013.01)

(58) Field of Classification Search
CPC ........ B60N 2/882; B60N 2/885; B60R 21/207
See application file for complete search history.

(56) References Cited

U.S. PATENT DOCUMENTS

| 4,161,794 | A | * | 7/1979 | Darnfors | A47C 7/383 5/644 |
| 5,487,197 | A | * | 1/1996 | Iskra, Jr. | A61G 5/1043 5/654 |
| 6,122,784 | A | * | 9/2000 | Hurwitz | A47C 7/383 5/636 |
| 6,671,908 | B2 | * | 1/2004 | Brown | A47C 7/546 5/644 |
| 7,059,678 | B1 | * | 6/2006 | Taylor | A47C 7/405 297/284.4 |
| 7,252,330 | B2 | * | 8/2007 | Lincoln | A47C 7/383 297/219.12 |
| 7,513,002 | B2 | * | 4/2009 | Best | A47G 9/1027 5/636 |
| 7,797,773 | B1 | * | 9/2010 | Wilk | A47C 7/383 5/640 |
| 2007/0033737 | A1 | * | 2/2007 | Melton | A47C 7/383 5/640 |

FOREIGN PATENT DOCUMENTS

| JP | 49-124215 U | 10/1974 |
| JP | 3169451 U | 7/2011 |

* cited by examiner

*Primary Examiner* — Philip F Gabler
(74) *Attorney, Agent, or Firm* — Oblon, McClelland, Maier & Neustadt, L.L.P.

(57) ABSTRACT

An airbag includes: a welding portion that bonds peripheral edges of a pair of sheet portions to each other to form a bag shape, in which the airbag is formed to have a pair of holding portions that holds a held body portion therebetween, and at least one of the two sheet portions is formed with a pair of melting portions extending in directions away from mutually facing portions of the two holding portions in the welding portion.

9 Claims, 5 Drawing Sheets

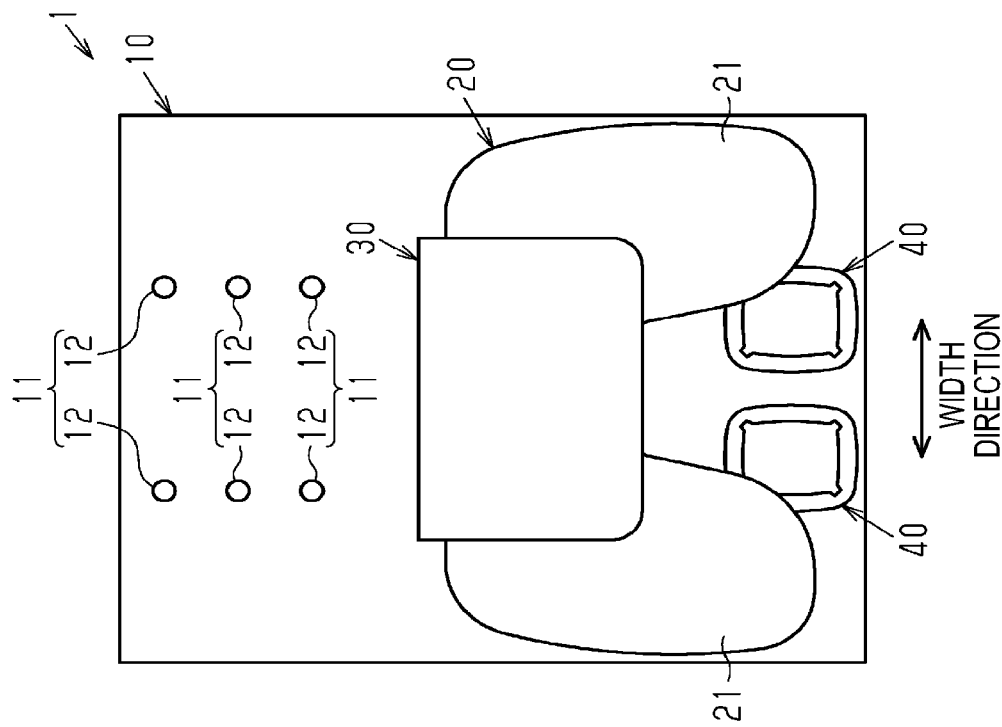
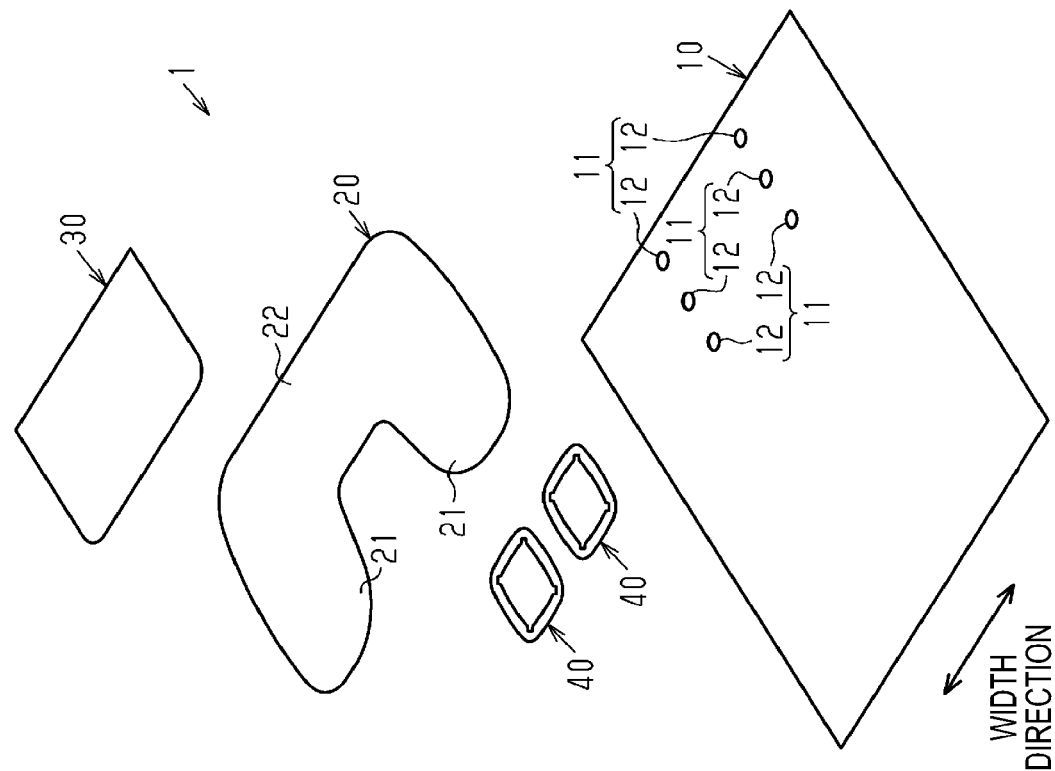

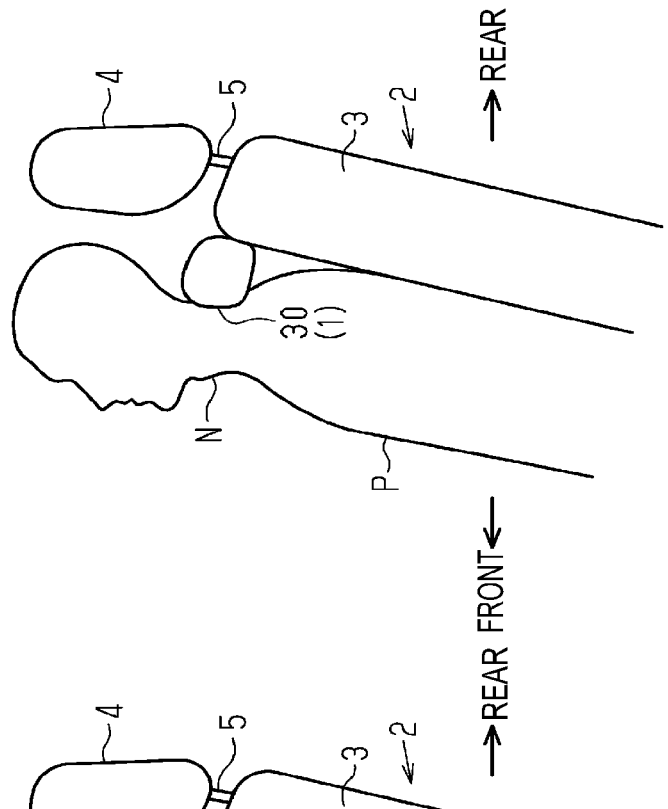
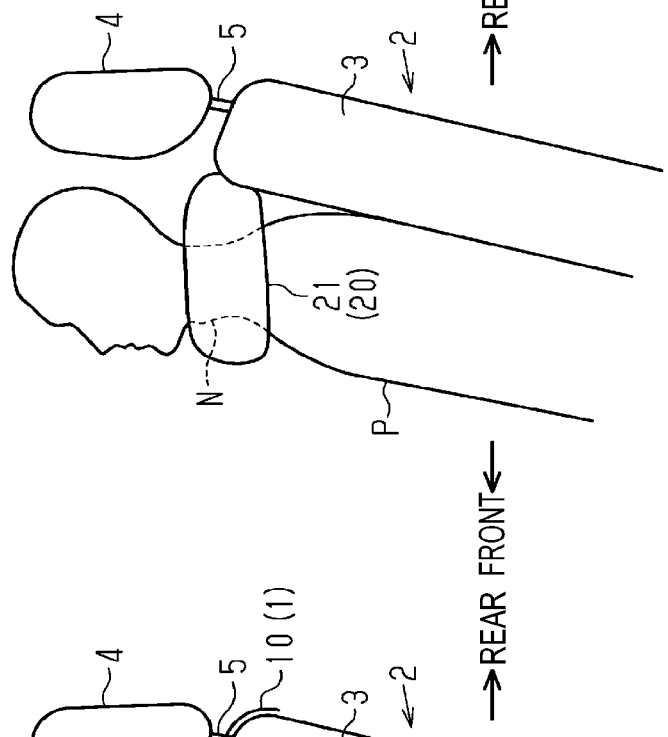
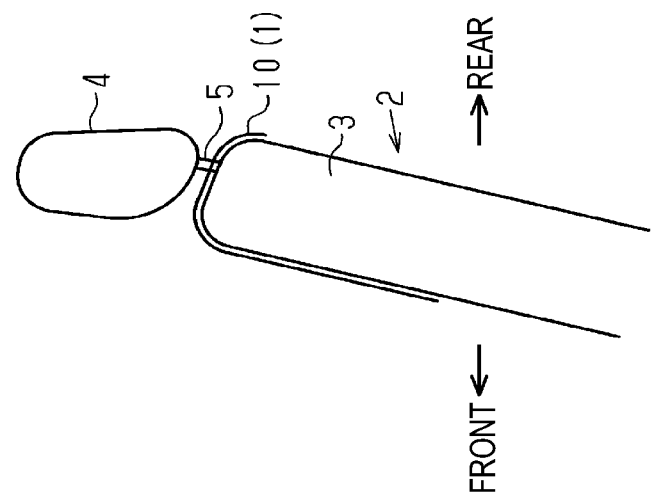

WIDTH DIRECTION

AIRBAG AND SUPPORT DEVICE

CROSS REFERENCE TO RELATED APPLICATIONS

This application is based on and claims priority under 35 U.S.C. § 119 to Japanese Patent Application 2018-209587, filed on Nov. 7, 2018, the entire contents of which are incorporated herein by reference.

TECHNICAL FIELD

This disclosure relates to an airbag and a support device.

BACKGROUND DISCUSSION

In the related art, an air waist pillow described in, for example, JP 549-124215U (Reference 1) is known as an airbag. The air waist pillow has a pair of holding portions with a held body portion (waist portion) therebetween and is formed in a U shape.

By the way, in Reference 1, the length of two holding portions is set sufficiently longer than the distance between the holding portions, i.e., the dimension of the held body portion. This is because the held body portion attains shallow holding and is unstable when the length of the two holding portions is short.

Thus, a need exists for an airbag and a support device which are not susceptible to the drawback mentioned above.

SUMMARY

An airbag according to an aspect of this disclosure includes a welding portion that bonds peripheral edges of a pair of sheet portions to each other to form a bag shape, in which the airbag is formed to have a pair of holding portions that holds a held body portion therebetween, and at least one of the two sheet portions is formed with a pair of melting portions extending in directions away from mutually facing portions of the two holding portions in the welding portion.

A support device according to another aspect of this disclosure includes the airbag and a mounting cloth to which the airbag is attached and which is capable of being mounted to a mounting target area of a vehicle seat.

BRIEF DESCRIPTION OF THE DRAWINGS

The foregoing and additional features and characteristics of this disclosure will become more apparent from the following detailed description considered with the reference to the accompanying drawings, wherein:

FIG. 1 is an exploded perspective view illustrating a structure of an airbag and a support device according to a first embodiment;

FIG. 2 is a front view illustrating a structure of the airbag and the support device according to the first embodiment;

FIGS. 3A to 3C are side views illustrating a mounting structure and function of the airbag and the support device according to the first embodiment;

DETAILED DESCRIPTION

First Embodiment

Figure 4:
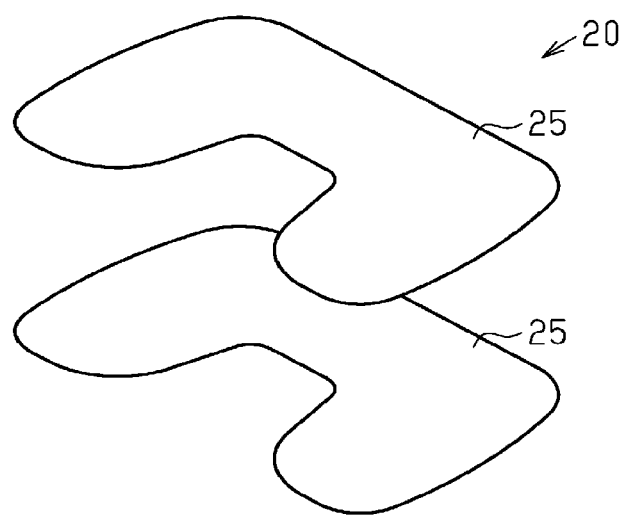
FIG. 4 is an exploded perspective view illustrating a structure of the airbag according to the first embodiment.

Hereinafter, a first embodiment of an airbag and a support device will be described.

As illustrated in FIGS. 1 and 2, a vehicle neck support device 1 includes a mounting cloth 10 formed of, for example, hard felt and having a substantially rectangular sheet shape, a resting support bladder 20, a normal support bladder 30, and a pair of refresh bladders 40, each bladder serving as a bag-shaped airbag formed of a resin material.

Multiple (e.g., three) mounting portions 11, each including a pair of mounting holes 12 arranged at an interval in the width direction, are provided side by side in the mounting cloth 10 in the vertical direction in FIG. 2.

The resting support bladder 20 includes a pair of holding portions 21 arranged at an interval in the width direction and a connection portion 22 interconnecting proximal ends of the two holding portions 21 in the width direction, and is formed in a U shape. The connection portion 22 of the resting support bladder 20 is attached to the mounting cloth 10 below the mounting portions 11 as illustrated. That is, the resting support bladder 20 is fixed to and supported by the mounting cloth 10 in such a cantilevered manner that the two holding portions 21 rise from the mounting cloth 10.

The resting support bladder 20 communicates with an appropriate air circuit which supplies and discharges air. The resting support bladder 20 is inflated while rising from the mounting cloth 10 when air is supplied, and is kept in an inflated state when the supply of air stops. Further, the resting support bladder 20 is contracted when the air is discharged.

The normal support bladder 30 has a substantially rectangular shape having a width dimension smaller than that of the resting support bladder 20. One end of the normal support bladder 30 is attached to the mounting cloth 10 above the resting support bladder 20 as illustrated so as to be adjacent thereto. That is, the normal support bladder 30 is fixed to and supported by the mounting cloth 10 in a cantilevered manner so as to be able to rise from the mounting cloth 10.

The normal support bladder 30 also communicates with an appropriate air circuit which supplies and discharges air. The normal support bladder 30 is inflated while rising from the mounting cloth 10 when air is supplied, and is kept in an inflated state when the supply of air stops. Further, the normal support bladder 30 is contracted when the air is discharged.

The two refresh bladders 40 are attached to the mounting cloth 10 at an interval in the width direction below the normal support bladder 30 as illustrated.

The two refresh bladders 40 also communicate with an appropriate air circuit which supplies and discharges air. The two refresh bladders 40 repeat inflation and contraction when air is periodically supplied and discharged.

In addition, each of the resting support bladder 20, the normal support bladder 30, and the two refresh bladders 40 is accommodated in a design cover (not illustrated) which is formed along the outer shape of the bladder.

Next, a mounting structure and function of the vehicle neck support device 1 will be described.

As illustrated in FIG. 3A, the vehicle neck support device 1 is provided on the upper end of a seat back 3 as a mounting target area constituting a backrest portion for a person P seated on a vehicle seat 2 in a state where the mounting cloth 10 is folded along the seat back 3. At this time, the mounting cloth 10 is fixed to the seat back 3 when a pair of stays 5 (only one being illustrated in FIG. 3A) which support a headrest 4 on the upper end of the seat back 3 in a vertically movable manner are inserted through the two mounting holes 12 of any one mounting portion 11.

Then, as illustrated in FIG. 3B, when the resting support bladder 20 is inflated, the two holding portions 21 rise forward. Accordingly, for example, while a vehicle is stopped, the seated person P may rest (relax, sleep, or the like) in a state where the neck N as the held body portion is placed between the two holding portions 21.

Meanwhile, as illustrated in FIG. 3C, when the normal support bladder 30 is inflated, the normal support bladder 30 rises forward. Accordingly, for example, during driving of the vehicle, the seated person P may reduce driving load by applying a rear portion of the neck N to the normal support bladder 30.

In addition, inflation and contraction of the two refresh bladders 40 may be repeated in the respective states illustrated in FIGS. 3B and 3C. In this case, the seated person P may refresh the periphery of the neck N with the two refresh bladders 40.

Next, a structure of the resting support bladder 20 will be described.

Figure 5:
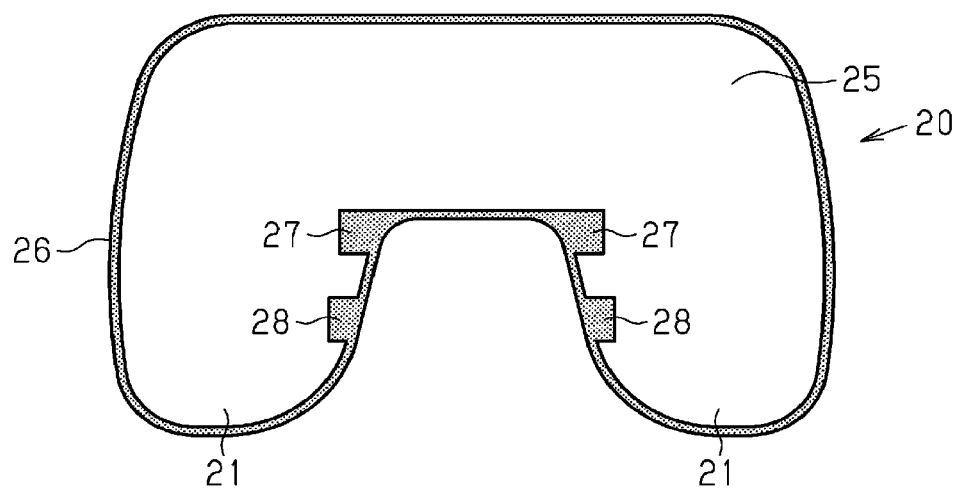
FIG. 5 is a view illustrating a structure of the airbag in a contracted state according to the first embodiment.

As illustrated in FIGS. 4 and 5, the resting support bladder 20 has a welding portion 26 (illustrated with a pattern for convenience in FIG. 5) which bonds peripheral edges of a pair of independent sheets 25, as a pair of sheet portions formed in a U shape along the outer shape of the bladder, to each other over the entire periphery thereof, and has a bag shape. Further, the resting support bladder 20 has inflation prevention welding portions 27 as a pair of melting portions formed on the two sheets 25 so as to bond the two sheets 25 to each other at the proximal ends of the two holding portions 21. Furthermore, the resting support bladder 20 has inflation prevention welding portions 28 as a pair of melting portions formed on the two sheets 25 so as to bond the two sheets 25 to each other at positions closer to the distal end sides of the two holding portions 21 than the inflation prevention welding portions 27. Both the inflation prevention welding portions 27 and 28 extend in the directions away from mutually facing portions of the two holding portions 21 in the welding portion 26.

Next, an action of the resting support bladder 20 will be described.

Figure 6:
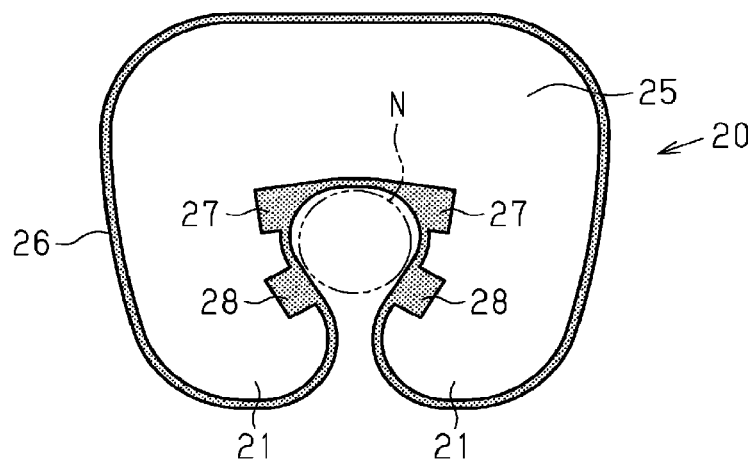
FIG. 6 is a view illustrating a structure of the airbag in an inflated state according to the first embodiment.

As illustrated in FIG. 6, when the resting support bladder 20 is inflated with the supply of air, the two holding portions 21 are prevented from being inflated in the inflation prevention welding portions 27 and 28, thereby being deformed such that the distal end sides thereof are closer to each other than the inflation prevention welding portions 27 and 28.

Effects of the present embodiment will be described.

(1) In the present embodiment, when the resting support bladder 20 is inflated with the supply of air, the two holding portions 21 are prevented from being inflated in the inflation prevention welding portions 27 and 28, thereby being deformed such that the distal end sides thereof are closer to each other than the inflation prevention welding portions 27 and 28, i.e., so as to surround the neck N. Accordingly, the neck N may be held in a more stable state by the resting support bladder 20 without making the two holding portions 21 unnecessarily long. Therefore, the resting support bladder 20 may be further downsized and moreover, the entire device may be further downsized.

(2) In the present embodiment, the inflation prevention welding portions 27 and 28 may be formed in accordance with formation of the welding portion 26 which bonds the peripheral edges of the two sheets 25 to each other. Accordingly, the number of manufacturing processes of the resting support bladder 20 may be further reduced.

(3) In the present embodiment, since the resting support bladder 20 is attached to the mounting cloth 10, the resting support bladder 20 may be disposed on the vehicle seat 2 when the mounting cloth 10 is mounted to the seat back 3.

(4) In the present embodiment, the resting support bladder 20 is constituted by the pair of independent sheets 25, the peripheral edges of which are bonded to each other over the entire periphery by the welding portion 26. In this way, since the two sheets 25 are independent of each other in a single item state, each sheet 25 may be downsized as compared with, for example, a case where the two sheets are connected as one sheet. Accordingly, the layout cutting of a material of the two sheets 25 may be made more efficient, and the yield of the material may be further improved.

(5) In the present embodiment, the vertical position of the resting support bladder 20 may be adjusted to suit to the physique of the seated person P by selecting any one of the multiple mounting portions 11 formed in the mounting cloth 10 and inserting the two stays 5 through the selected mounting portion 11.

(6) In the present embodiment, when the resting support bladder 20 is inflated, the neck N of the seated person P may be supported at the time of a rest. At this time, by adjusting the amount of air (or internal pressure) supplied to the resting support bladder 20, the support shape may be changed, for example, in accordance with the preference of the seated person P. Further, when the normal support bladder 30 is inflated, the neck N of the seated person P may be supported at the time of driving. At this time, by adjusting the amount of air (or internal pressure) supplied to the normal support bladder 30, the support shape may be changed, for example, in accordance with the preference of the seated person P. Further, when the two refresh bladders 40 repeat inflation and contraction, the periphery of the neck N of the seated person P may be refreshed at the time of a rest or at the time of driving.

(7) In the present embodiment, the resting support bladder 20 is contracted, thereby being deformed so as to be bent along with the seat back 3. Therefore, the space occupied by the resting support bladder 20 when not in use may be reduced, and moreover, it is possible to prevent the resting support bladder 20 from disturbing the seated person P. Similarly, the normal support bladder 30 is contracted, thereby being deformed so as to be bent along with the seat back 3. Therefore, the space occupied by the normal support bladder 30 when not in use may be reduced, and moreover, it is possible to prevent the normal support bladder 30 from disturbing the seated person P.

(8) In the present embodiment, since both the resting support bladder 20 and the normal support bladder 30 are attached to the mounting cloth 10, they may be used without replacement in both situations (during a rest or during driving).

Second Embodiment

Hereinafter, a second embodiment of an airbag and a support device will be described.

Figure 7:
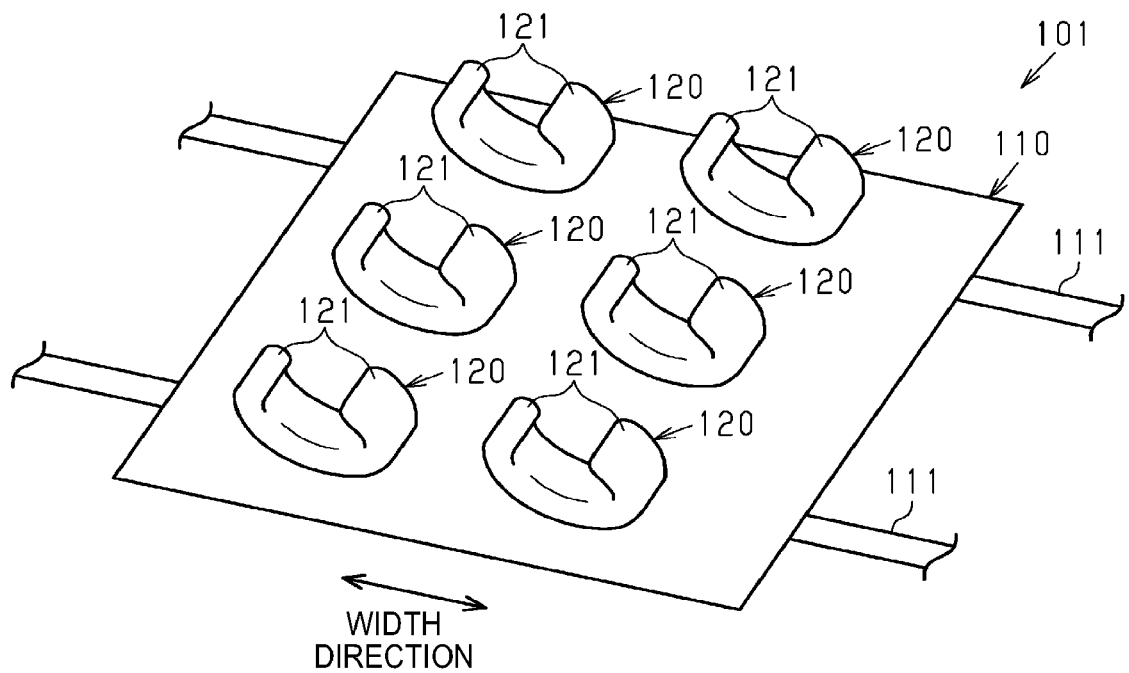
FIG. 7 is a perspective view illustrating a structure of an airbag and a support device according to a second embodiment.

As illustrated in FIG. 7, a vehicle leg refresh device 101 includes a mounting cloth 110 formed of, for example, hard felt and having a substantially rectangular sheet shape and refresh bladders 120 as multiple (six) airbags formed of a resin material. These refresh bladders 120 are provided side by side in the vertical direction as illustrated in a state of being paired in the width direction.

Terminals of mounting portions 111 formed of a pair of rubber bands arranged at an interval in the vertical direction as illustrated are attached respectively to both ends in the width direction of the mounting cloth 110.

Each refresh bladder 120 includes a pair of holding portions 121 arranged at an interval in the width direction, and is formed in a U shape. Each refresh bladder 120 is attached to the mounting cloth 110 at one end thereof where the U-shape is closed, and is fixed to and supported by the mounting cloth 10 in a cantilevered manner in a state where the two holding portions 121 rise from the mounting cloth 10.

Each refresh bladder 120 communicates with an appropriate air circuit which supplies and discharges air. Each refresh bladder 120 repeats inflation and contraction when air is periodically supplied and discharged. In addition, each refresh bladder 120 is accommodated in a design cover (not illustrated) formed in accordance with the outer shape of the bladder.

Next, a mounting structure and function of the vehicle leg refresh device 101 will be described.

Figure 8:
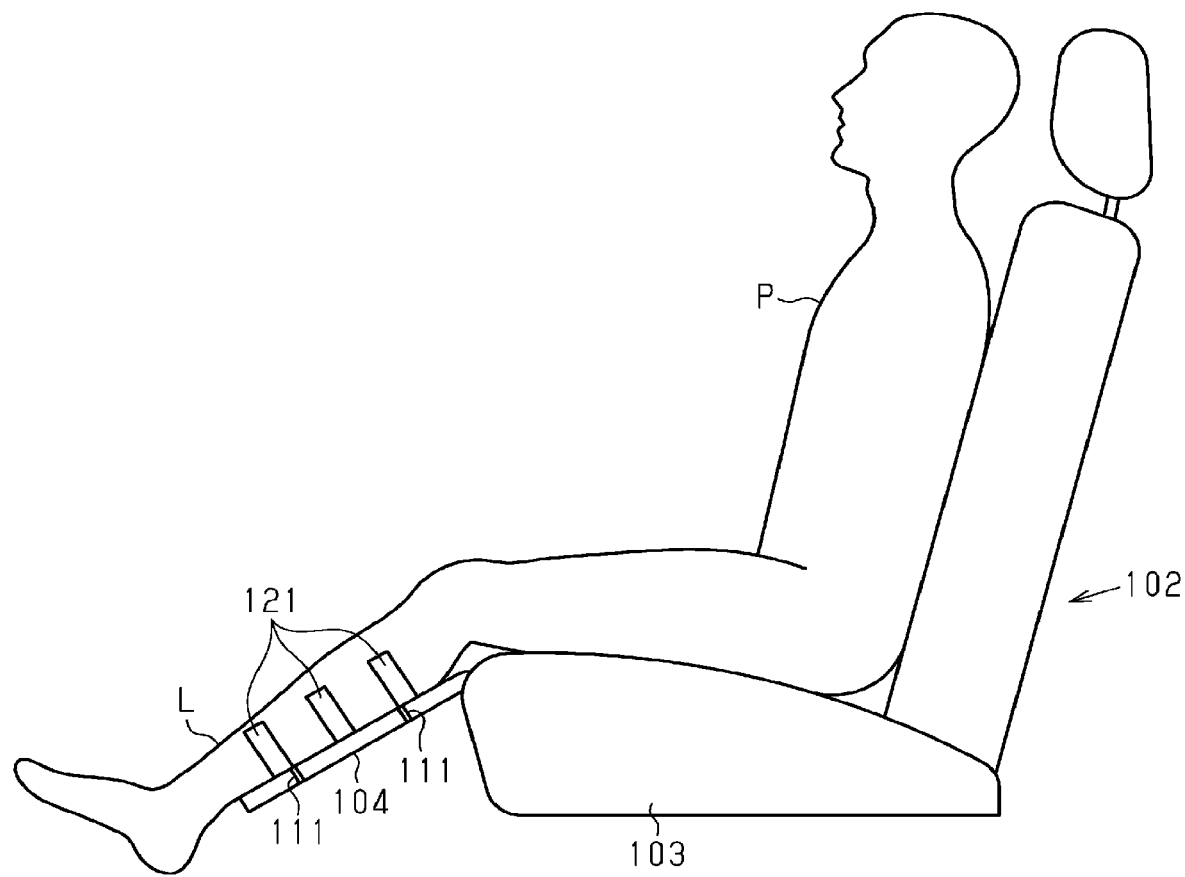
FIG. 8 is a side view illustrating a mounting structure and function of the airbag and the support device according to the second embodiment.

As illustrated in FIG. 8, the vehicle leg refresh device 101 is mounted in a state where the mounting cloth 110 is placed on an ottoman 104 as a mounting target area provided on the front end of a seat cushion 103 constituting a seating portion for the person P seated on a vehicle seat 102. At this time, the mounting cloth 110 is fixed to the ottoman 104 when the two mounting portions 111 hung so as to surround the ottoman 104.

Then, one lower leg portion L of the seated person P is fitted into three refresh bladders 120 on one side in the width direction. Accordingly, the seated person P may refresh two lower leg portions L by repeated inflation and contraction of all of the refresh bladders 120.

In addition, each refresh bladder 120 also includes the welding portion 26 and the pair of inflation prevention welding portions 27 and 28 as in the resting support bladder 20. Accordingly, when each refresh bladder 120 is inflated with the supply of air, the two holding portions 121 are deformed so as to be close to each other in the above-described manner.

As described above in detail, according to the present embodiment, in addition to the effects (1) to (4) in the first embodiment, the following effects may be obtained.

(1) In the present embodiment, each refresh bladder 120 is deformed such that the two holding portions 121 surround the lower leg portion L when the refresh bladder 120 is inflated, thereby refreshing the lower leg portion L of the seated person P by repeatedly pressing the lower leg portion L, for example, as if the lower leg portion P is surrounded by human hands.

(2) In the present embodiment, each refresh bladder 120 may not only hold the lower leg portion L but also refresh the lower leg portion L. Therefore, for example, the number of necessary bladders may be reduced as compared with a case where a holding bladder and a refresh bladder for the lower leg portion L are separately provided.

The present embodiment may be implemented with the following modifications. The present embodiment and the following modifications may be implemented in combination with each other within a technically consistent range.

Figure 9:
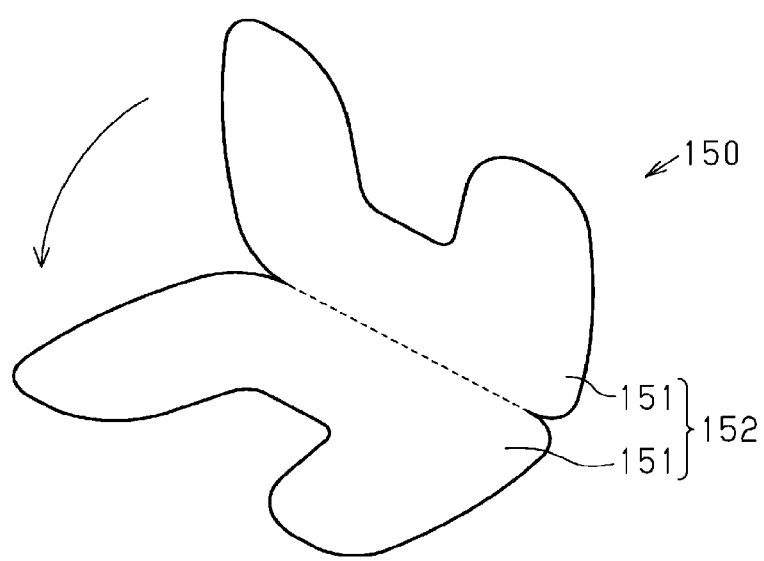
FIG. 9 is an exploded perspective view illustrating a structure of an airbag according to a modification.

As illustrated in FIG. 9, there may be provided an airbag (resting support bladder or refresh bladder) 150 including a single sheet 152 in which proximal ends of a pair of U-shaped sheet portions 151 are connected to each other in a foldable manner. That is, the two sheet portions 151 may be formed by folding back one sheet 152. In this case, the airbag 150 is manufactured by bonding the peripheral edges of the two sheet portions 151 except the folding start point (broken line in the drawing) of the sheet 152 in a welding portion. In this case, since the two sheet portions 151 are connected as one sheet 152, the number of parts may be reduced.

Figure 10:
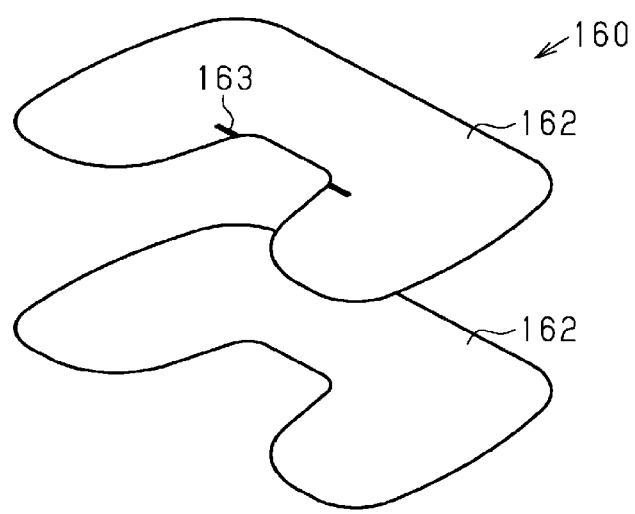
FIG. 10 is an exploded perspective view illustrating a structure of an airbag according to another modification.

As illustrated in FIG. 10, there may be provided an airbag (resting support bladder or refresh bladder) 160 in which a pair of melting portions 163 are formed on only one of a pair of U-shaped sheets 162. The two melting portions 163 also extend in the directions away from mutually facing portions of two holding portions in a welding portion. Even if this modification is made, when the airbag 160 is inflated with the supply of air, the two holding portions are prevented from being inflated in the melting portions 163, thereby being deformed such that the distal end sides thereof are closer to each other than the melting portions 163.

In the first embodiment, any one of the two inflation prevention welding portions 27 and the two inflation prevention welding portions 28 may be omitted.

In the first embodiment, at least one of the resting support bladder 20 and the normal support bladder 30 may be inflated with a mouth or an air pump.

In the first embodiment, air may be periodically supplied to and discharged from the resting support bladder 20 to repeat inflation and contraction thereof. In this case, the neck N of the seated person P may be refreshed. In particular, the resting support bladder 20 may be deformed such that the two holding portions 21 surround the neck N when inflated, thereby refreshing the neck N of the seated person P by repeatedly pressing the neck N, for example, as if the neck N is surrounded with human hands.

In the first embodiment, the resting support bladder 20 may be used as a single item independent of the mounting cloth 10.

In the second embodiment, each refresh bladder 120 may be kept in an inflated state. With this modification, each refresh bladder 120 may continuously hold the lower leg portion L. In addition, in this case, each refresh bladder 120 may be inflated with a mouth or an air pump.

In the second embodiment, the mounting portion 111 may be a belt.

In each of the above embodiments, the number and arrangement of inflation prevention welding portions may be arbitrary changed as long as they are paired to extend in the directions away from mutually facing portions of the two holding portions 21 or 121 in the welding portion 26.

In each of the above embodiments, the airbag may hold the waist portion, the thigh portion, the arm portion as the held body portion.

The technical ideas that may be grasped from the embodiments and the modifications will be described.

An airbag according to an aspect of this disclosure includes a welding portion that bonds peripheral edges of a pair of sheet portions to each other to form a bag shape, in which the airbag is formed to have a pair of holding portions that holds a held body portion therebetween, and at least one of the two sheet portions is formed with a pair of melting portions extending in directions away from mutually facing portions of the two holding portions in the welding portion.

According to the above configuration, when the airbag is inflated with the supply of air, the two holding portions are prevented from being inflated in the melting portions, thereby being deformed such that distal end sides thereof are closer to each other than the melting portions, i.e., so as to surround the held body portion. Accordingly, it is possible to hold the held body portion in a more stable state without making the two holding portions unnecessarily long.

In the airbag, it is preferable that the melting portions are inflation prevention welding portions formed on the two sheet portions so as to bond the two sheet portions to each other.

According to the above configuration, the melting portions are the inflation prevention welding portions that bond the two sheet portions to each other. Thus, the melting portions may be formed in accordance with formation of the welding portion that bonds the peripheral edges of the two sheet portions to each other. Accordingly, it is possible to further reduce the number of manufacturing processes.

In the airbag, it is preferable that a plurality of pairs of melting portions are provided at intervals along the held body portion.

A support device according to another aspect of this disclosure includes the airbag and a mounting cloth to which the airbag is attached and which is capable of being mounted to a mounting target area of a vehicle seat.

According to the above configuration, when the mounting cloth is mounted to the mounting target area, the airbag may be disposed on the vehicle seat.

According to the aspects of this disclosure, it is possible to hold a held body portion in a more stable state without making two holding portions unnecessarily long.

In the airbag, it is preferable that the two sheet portions are a pair of independent sheets the peripheral edges of which are bonded to each other over the entire periphery by the welding portion.

According to this configuration, the two sheets are independent of each other in a single item state, so that each sheet may be further downsized as compared with, for example, a case where two sheet portions are connected as one sheet. Accordingly, the layout cutting of a material of the two sheets may be made more efficient, and the yield of the material may be further improved.

In the airbag, it is preferable that the two sheet portions are formed by folding back one sheet.

According to this configuration, since the two sheet portions are connected as one sheet, the number of parts may be reduced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An airbag comprising:
   a welding portion that bonds peripheral edges of a pair of sheet portions to each other to form a bag shape;
   a pair of holding portions that holds a held body portion therebetween and respective distal ends of the pair of holding portions are arranged apart from each other, wherein
   at least one of the two sheet portions includes a pair of melting portions extending in directions away from mutually facing portions between the two holding portions in the welding portion, and
   the melting portions prevent inflation of the holding portion at the melting portions so that the distal ends of the pair of holding portions are closer to each other than the melting portions when the airbag is inflated.

2. The airbag according to claim 1, wherein
   the melting portions are inflation prevention welding portions formed on the two sheet portions so as to bond the two sheet portions to each other.

3. The airbag according to claim 2, wherein
   a plurality of pairs of melting portions are provided at intervals along the held body portion.

4. A support device comprising:
   the airbag according to claim 3; and
   a mounting cloth to which the airbag is attached and which is capable of being mounted to a mounting target area of a vehicle seat.

5. A support device comprising:
   the airbag according to claim 2; and
   a mounting cloth to which the airbag is attached and which is capable of being mounted to a mounting target area of a vehicle seat.

6. The airbag according to claim 1, wherein
   a plurality of pairs of melting portions are provided at intervals along the held body portion.

7. A support device comprising:
   the airbag according to claim 6; and
   a mounting cloth to which the airbag is attached and which is capable of being mounted to a mounting target area of a vehicle seat.

8. A support device comprising:
   the airbag according to claim 1; and
   a mounting cloth to which the airbag is attached and which is capable of being mounted to a mounting target area of a vehicle seat.

9. The airbag according to claim 1, wherein
   the pair of sheet portions have a U-shape and the distal ends of the pair of holding portions are arranged along the respective legs of the U-shape.

* * * * *